United States Patent
Okumiya et al.

(10) Patent No.: US 11,175,124 B2
(45) Date of Patent: Nov. 16, 2021

(54) STRAIN SENSOR UNIT

(71) Applicant: Yamaha Corporation, Hamamatsu (JP)

(72) Inventors: Yasuro Okumiya, Mori-machi (JP);
Katsunori Suzuki, Hamamatsu (JP);
Koji Yataka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 271 days.

(21) Appl. No.: 16/185,147

(22) Filed: Nov. 9, 2018

(65) Prior Publication Data

US 2019/0094004 A1 Mar. 28, 2019

Related U.S. Application Data

(63) Continuation of application No. PCT/JP2017/017068, filed on Apr. 28, 2017.

(30) Foreign Application Priority Data

May 10, 2016 (JP) .............................. JP2016-094481

(51) Int. Cl.
*G01L 1/22* (2006.01)
*G01B 7/16* (2006.01)

(52) U.S. Cl.
CPC .............. *G01B 7/18* (2013.01); *G01L 1/2206* (2013.01); *G01L 1/2268* (2013.01)

(58) Field of Classification Search
CPC .......... G01L 1/22; G01L 1/287; G01L 1/2206
See application file for complete search history.

(56) References Cited

U.S. PATENT DOCUMENTS

| 7,791,476 B2 | 9/2010 | Hawkins et al. |
| 2007/0194900 A1 | 8/2007 | Hawkins et al. |
| 2008/0030310 A1* | 2/2008 | Okada ................. B60R 25/1004 340/426.27 |
| 2013/0118267 A1* | 5/2013 | Suzuki ..................... G01B 7/18 73/774 |

(Continued)

FOREIGN PATENT DOCUMENTS

| CA | 2 642 222 A1 | 8/2007 |
| CN | 105486218 A | 4/2016 |

(Continued)

OTHER PUBLICATIONS

Japanese-language Office Action issued in counterpart Japanese Application No. 2016-094481 dated Dec. 3, 2019 with English translation (five pages).

(Continued)

*Primary Examiner* — Herbert K Roberts
(74) *Attorney, Agent, or Firm* — Crowell & Moring LLP

(57) ABSTRACT

Provided is a strain sensor unit that enables inhibition of a positional deviation of a strain sensor. The strain sensor unit includes: a substrate that is stretchable; at least one strip-shaped or string-shaped strain sensor that is arranged on the substrate along a direction of stretching and contracting of the substrate; and a deformation restraining member that is arranged in proximity to longitudinal end portions of the at least one strain sensor respectively, to extend in a direction intersecting a longitudinal direction of the strain sensor, and restrains deformation of the substrate.

7 Claims, 3 Drawing Sheets

(56) References Cited

U.S. PATENT DOCUMENTS

| | | | |
|---|---|---|---|
| 2014/0296669 A1* | 10/2014 | Gertsch | A61B 5/0008 600/324 |
| 2014/0331793 A1* | 11/2014 | Suzuki | G01L 1/2287 73/862.629 |
| 2017/0034907 A1* | 2/2017 | Iwase | A61B 5/021 |
| 2017/0074636 A1* | 3/2017 | Otaka | A61B 5/11 |
| 2017/0215495 A1 | 8/2017 | Okumiya et al. | |
| 2018/0116559 A1* | 5/2018 | Otaka | A61B 5/6804 |

FOREIGN PATENT DOCUMENTS

| | | |
|---|---|---|
| EP | 3 208 687 A1 | 8/2017 |
| JP | 2000-159052 A | 6/2000 |
| JP | 2004-258041 A | 9/2004 |
| JP | 2009-527767 A | 7/2009 |
| JP | 2011-047702 A | 3/2011 |
| JP | 2016-145725 A | 8/2016 |
| JP | 2016145725 A * | 8/2016 |
| WO | WO 2016/060031 A1 | 4/2016 |

OTHER PUBLICATIONS

English translation of Chinese Office Action issued in counterpart Chinese Application No. 201780028543.6 dated Dec. 13, 2019 (nine pages).

International Search Report (PCT/ISA/210) issued in PCT Application No. PCT/JP2017/017068 dated Jul. 11, 2017 with English translation (five (5) pages).

Chinese-language Office Action issued in Chinese Application No. 201780028543.6 dated Sep. 1, 2020 with English translation (14 pages).

Chinese-language Office Action issued in Chinese Application No. 201780028543.6 dated Mar. 4, 2021 with English translation (16 pages).

Chinese-language Office Action issued in Chinese Application No. 201780028543.6 dated Jun. 23, 2021 with English translation (14 pages).

* cited by examiner

STRAIN SENSOR UNIT

BACKGROUND OF THE INVENTION

The present invention relates to a strain sensor unit.

DESCRIPTION OF THE RELATED ART

A strain sensor unit has been known that detects a strain through a change of resistance of a resistor in response to stretching and contracting. As such resistors, metals and semiconductors are typically used. However, a deformation amount of reversible stretching of metals and semiconductors is small. Consequently, a strain sensor unit including a metal or a semiconductor as a resistor has limited applications.

In this respect, a strain sensor unit has been proposed including carbon nanotubes (CNT) as the resistor (see Japanese Unexamined Patent Application, Publication No. 2011-47702). The strain sensor unit disclosed in the above application includes a carbon nanotube film containing a plurality of carbon nanotubes oriented in a particular direction. Specifically, in the aforementioned strain sensor unit, both end portions of a strip-shaped carbon nanotube film are fixed to a measurement target and a stretch strain of the carbon nanotube film is detected. The carbon nanotube film is capable of stretching relatively greatly in a direction parallel or perpendicular to a direction of orientation of the carbon nanotubes, and thus the strain sensor is suited for a great strain.

The above patent application also proposes arranging the strain sensor unit onto a glove to detect movements of hand fingers. In the case of thus arranging the strain sensor unit including the carbon nanotube film to a fabric to be placed on a surface of a human body, positional deviation of the strain sensor unit may be caused when the fabric slides on the surface of the human body. Depending on a measurement target site, a positional deviation of the fabric with respect to the human body may be more likely to be caused, or detection accuracy may be largely deteriorated by a slight positional deviation of the strain sensor unit.

PRIOR ART DOCUMENTS

Patent Documents

Patent Document 1: Japanese Unexamined Patent Application, Publication No. 2011-47702

SUMMARY OF THE INVENTION

Problems to be Solved by the Invention

In view of the aforementioned disadvantages, an object of the present invention is to provide a strain sensor unit that enables restraining of a positional deviation of a strain sensor.

Means for Solving the Problems

The strain sensor unit according to an aspect of the present invention made for solving the aforementioned problems includes: a substrate that is stretchable; at least one strip-shaped or string-shaped strain sensor that is arranged on the substrate along a direction of stretching and contracting of the substrate; and at least one deformation restraining member that is arranged in proximity to longitudinal end portions of the at least one strain sensor respectively, to extend in a direction intersecting a longitudinal direction of the strain sensor, and restrains deformation of the substrate.

The deformation restraining member may include an elastic material having a greater modulus of elasticity in flexure than the strain sensor.

The at least one deformation restraining member may include at least a pair of deformation restraining members, and the pair of the deformation restraining members may be arranged in proximity to both longitudinal end portions of the at least one strain sensor, respectively.

The deformation restraining member may be arranged to overlap the longitudinal end portion of the at least one strain sensor.

The at least one strain sensor may include a plurality of strain sensors which are arranged in parallel, and the substrate may have, between the plurality of strain sensors, a slit that is parallel to the strain sensors.

The deformation restraining member may include a closely coiled spring having a central axis extending in a direction intersecting the longitudinal direction of the strain sensor.

A pair of anti-slipping members may be further provided that are arranged on a back face of the substrate, on both longitudinal-end sides of the strain sensor in a planar view, respectively.

It is to be noted that being "in proximity to" the strain sensor as referred to means a region within a distance from the longitudinal end of the strain sensor being 1/5 or less and preferably 1/10 or less of an average length of the strain sensor. In addition, "modulus of elasticity in flexure" as referred to means a value measured pursuant to JIS-K7171 (2008). Furthermore, "back face" as referred to means a face that is to face the measurement target.

Effects of the Invention

The strain sensor unit of the present invention enables restraining of the positional deviation of the strain sensor.

DESCRIPTION OF EMBODIMENTS

Embodiments of the present invention will be described in detail hereinafter, with appropriate reference to the drawings.

First Embodiment

Figure 1:
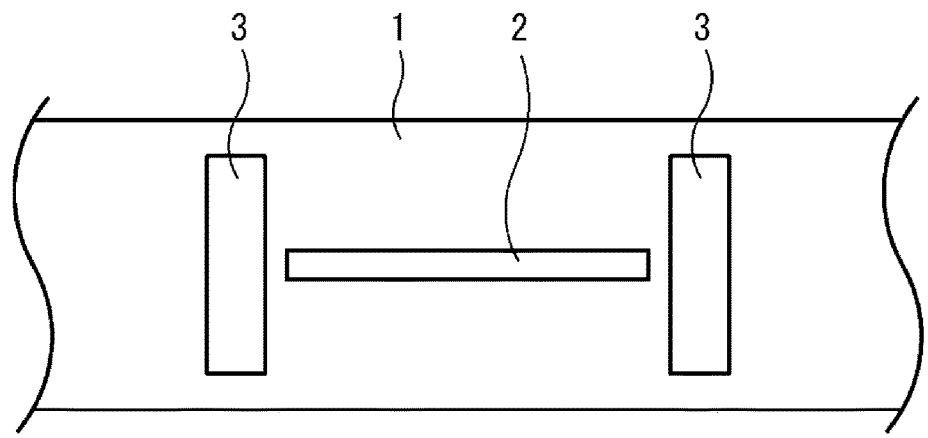
FIG. 1 is a schematic plan view of a strain sensor unit according to one embodiment of the present invention.
Figure 2:
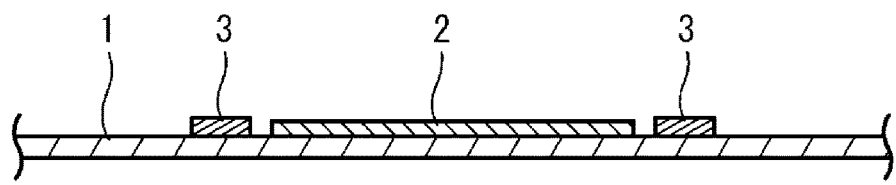
FIG. 2 is a schematic cross sectional view of the strain sensor unit illustrated in FIG. 1.

The strain sensor unit according to a first embodiment of the present invention shown in FIGS. 1 and 2 includes: a substrate 1 that is stretchable; a strip-shaped strain sensor 2 that is overlaid on the substrate 1 and arranged along a direction of stretching and contracting of the substrate 1; and a pair of deformation restraining members 3 that are arranged in proximity to longitudinal end portions of the strain sensor 2 respectively, to extend in a direction intersecting a longitudinal direction of the strain sensor 2, and restrain deformation of the substrate 1.

The strain sensor unit is usable for detecting movements of a particular site of a human body or an animal body, for example. Specific examples of an intended usage of the strain sensor unit include detection of movements of the mimic muscles of a human face, the temporomandibular joints, or the like.

Substrate

The substrate 1 is a structural material of the strain sensor unit and formed from a sheet-like material, having been provided with at least a portion formed in a strip shape for carrying the strain sensor 2. The substrate 1 carries the strain sensor 2 and is configured to be attachable to a measurement target. The substrate 1 stretches and contracts together with the movements of the measurement target and transmits the stretching and contracting to the strain sensor 2, such that the strain sensor 2 stretches and contracts together with the movements of the measurement target.

The material for forming the substrate 1 is not particularly limited as long as the material is stretchable, and examples thereof include: a nonwoven fabric; a woven fabric constituted from warps oriented in a particular direction and wefts oriented in a direction intersecting the particular direction and regularly intertangled with the warps; a knitted fabric, etc. constituted from a large number of loops intertangled with each other formed from at least one thread; a sheet obtained by impregnating any of the aforementioned fabrics with an elastomer; a sheet formed from an elastomer containing no fiber; and the like. Of these, in light of stretchability, the woven fabric is preferred for forming the substrate 1.

An attaching structure of the substrate 1 with respect to the measurement target is exemplified by: a structure in which the substrate 1 is formed in an annular shape beforehand so as to enable attachment to an outer periphery of the measurement target; a structure in which a strip-shaped substrate 1 can form an annular shape upon wearing through connection of both ends by means of hook-and-loop fasteners, etc.; and a structure in which both ends of the strip-shaped substrate 1 have hooks or loops that can engage with a protruding part, etc. of the measurement target. Specific examples of the attaching structure of the substrate 1 include structures similar to: clothes such as tights; sports guards; masks; and the like that are to be in close contact with the human body.

The lower limit of an average width of the substrate 1 is preferably 1 cm and more preferably 1.5 cm. Meanwhile, the upper limit of the average width of the substrate 1 is preferably 10 cm and more preferably 7 cm. When the average width of the substrate 1 is less than the lower limit, deviation of the attached position may be caused by deformation of the substrate 1 in the plane direction. To the contrary, when the average width of the substrate 1 is greater than the upper limit, motion of a subject (person whose body movements are to be measured) wearing the strain sensor unit may be inhibited or discomfort may be imparted.

The lower limit of an average thickness of the substrate 1 is preferably 100 μm and more preferably 200 μm. Meanwhile, the upper limit of the average thickness of the substrate 1 is preferably 2 mm and more preferably 1 mm. When the average thickness of the substrate 1 is less than the lower limit, strength of the substrate 1 may be insufficient. To the contrary, when the average thickness of the substrate 1 is greater than the upper limit, motion of the subject wearing the strain sensor unit may be inhibited or discomfort may be imparted.

The lower limit of a quantity per unit area of the substrate 1 is preferably 100 g/m$^2$ and more preferably 150 g/m$^2$. Meanwhile, the upper limit of the quantity per unit area of the substrate 1 is preferably 300 g/m$^2$ and more preferably 250 g/m$^2$. When the quantity per unit area of the substrate 1 is less than the lower limit, strength of the substrate 1 may be insufficient. To the contrary, when the quantity per unit area of the substrate 1 is greater than the upper limit, detection sensitivity may be insufficient, motion of the subject wearing the strain sensor unit may be inhibited, or discomfort may be imparted, due to high rigidity of the substrate 1.

The lower limit of the load at 100% elongation of the substrate 1 (tension required to elongate the substrate 1 twice in average length) is preferably 1 N and more preferably 10 N. Meanwhile, the upper limit of the load at 100% elongation of the substrate 1 is preferably 10 kN and more preferably 1 kN. When the load at 100% elongation of the substrate 1 is less than the lower limit, the contracting force of the substrate 1 may be insufficient, whereby detection during contracting may be delayed or the detection accuracy may be deteriorated by positional deviation. To the contrary, when the load at 100% elongation of the substrate 1 is greater than the upper limit, motion of the measurement target site may be inhibited and the subject may feel discomfort.

Strain Sensor

The strain sensor 2 is overlaid on and fixed to a front face (face on the opposite side to the measurement target) of the substrate 1. More specifically, in the strain sensor unit, the strain sensor 2 is adhesively attached to the center of the substrate 1 in the crosswise direction. By thus adhesively attaching the strain sensor 2 at a center portion of the substrate 1, the substrate 1 in a circumference of the strain sensor 2 is allowed to stretch and contract uniformly, thereby enabling the positional deviation of the strain sensor 2 to be inhibited.

In addition, the strain sensor 2 is formed in a strip shape and configured to detect principally the stretching and contracting in the longitudinal direction. Therefore, in the strain sensor unit of the present embodiment, the strain sensor 2 detects principally the stretching and contracting of the substrate 1 in the longitudinal direction. It is to be noted that "to detect principally the stretching and contracting in the longitudinal direction" as referred to means that a contribution ratio of a longitudinal stretching/contracting component in a detection value is 90% or greater, preferably 95% or greater.

As the strain sensor 2, a strain resistance element, of which resistance value changes upon stretch and/or contraction, may be used, and in particular, a CNT strain sensor employing carbon nanotubes (which may be hereinafter referred to as "CNT") is suitably used. In other words, the strain sensor unit of the present invention detects a stretching/contracting amount of the substrate 1 that varies in accordance with the motion of the measurement target site, by measuring a resistance value of the strain sensor 2 constituted with a strain resistance element by means of a detection circuit (not illustrated in the figure).

The CNT strain sensor can be configured to include, for example: a stretchable sheet-like supporting film adhesively attached to the substrate 1; a CNT film overlaid on the front face side of the supporting film; and a protective film that protects the CNT film.

An average thickness of the supporting film of the CNT strain sensor may be, for example, 10 µm or greater and 5 mm or less.

A material for the supporting film is not particularly limited as long as being flexible, and is exemplified by a synthetic resin, a rubber, a nonwoven fabric, and the like.

Examples the synthetic resin include a phenol resin (PF), an epoxy resin (EP), a melamine resin (MF), a urea resin (UF), an unsaturated polyester (UP), an alkyd resin, polyurethane (PUR), thermosetting polyimide (PI), polyethylene (PE), high density polyethylene (HDPE), medium density polyethylene (MDPE), low density polyethylene (LDPE), polypropylene (PP), polyvinyl acetate (PVC), polyvinylidene chloride, polystyrene (PS), polyvinyl acetate (PVA), an acrylonitrile-butadiene-styrene resin (ABS), an acrylonitrile-styrene resin (AS), polymethyl methacrylate (PMMA), polyamide (PA), polyacetal (POM), polycarbonate (PC), modified-polyphenylene ether (m-PPE), polybutylene terephthalate (PBT), polyethylene terephthalate (PET), cyclic polyolefin (COP), and the like.

Examples of the rubber include a natural rubber (NR), an isobutylene-isoprene rubber (IIR), an isoprene rubber (IR), an ethylene propylene rubber (EPDM), a butadiene rubber (BR), a urethane rubber (U), a styrene-butadiene rubber (SBR), a silicone rubber (Q), a chloroprene rubber (CR), a chlorosulphonated polyethylene rubber (CSM), an acrylonitrile-butadiene rubber (NBR), a chlorinated polyethylene (CM), an acrylic rubber (ACM), an epichlorohydrin rubber (CO, ECO), a fluororubber (FKM), dimethylpolysiloxane (PDMS), and the like. Of these rubbers, a natural rubber is preferred in light of strength and the like.

In addition, an electrode is provided at both end portions of the CNT film of the CNT strain sensor, and the wiring is joined to the electrode by way of, for example, a conductive adhesive.

The CNT film is formed from a resin composition containing a large number of CNT fibers. Specifically, the CNT film includes: a plurality of CNT fiber bundles composed of a plurality of CNT fibers oriented in one direction; and a resin layer that covers a peripheral surface of the plurality of CNT fiber bundles. When a strain is applied that extends such a CNT film, the state of contact among the CNT fibers changes, allowing the strain sensor to provide a change in resistance. It is to be noted that in order to more efficiently detect a strain, the CNT fibers in the CNT film are preferably oriented in the direction of stretch and contraction.

The lower limit of the average thickness of the CNT film in an unloaded state is preferably 1 µm, and more preferably 10 µm. Meanwhile, the upper limit of the average thickness of the CNT film is preferably 1 mm, and more preferably 0.5 mm. When the average thickness of the CNT film is less than the lower limit, forming such a thin film may be difficult, and a resistance upon stretch may be excessively increased. To the contrary, when the average thickness of the CNT film is greater than the upper limit, the elasticity may be insufficient, and the resistance change in response to stretch and/or contraction, i.e., detection sensitivity, may be insufficient and the subject may feel discomfort.

It is to be noted that the CNT film may have either a monolayer structure in which the CNT fibers are planarly arranged substantially in parallel, or a multilayer structure. However, a multilayer structure is preferred in light of securing a certain electrical conductivity.

As the CNT fibers, either single-layered single wall nanotubes (SWNT) or multilayered multi-wall nanotubes (MWNT) may be used, of which MWNT is preferred in light of electrical conductivity and thermal capacity, and MWNT having a diameter within a range of no less than 1.5 nm and no greater than 100 nm is more preferred.

The resin layer of the CNT film contains a resin as a principal component, and covers the peripheral surface of the plurality of CNT fiber bundles. Examples of the principal component of the resin layer include the synthetic resins, the rubbers and the like exemplified in connection with the material for the supporting film, among which the rubber is preferred. Use of the rubber enables a sufficient function of protecting the CNT fibers to be exerted even against a great strain. The resin layer of the CNT film may be formed integrally with the supporting film or the protective film. In other words, the supporting film or the protective film may be omitted by increasing the thickness of the resin layer having not penetrated into the layer of the CNT fibers.

The lower limit of the average width, in the unloaded state, of the strain sensor 2 constituted from the CNT strain sensor is preferably 0.1 mm, and more preferably 0.5 mm. Meanwhile, the upper limit of the average width of the strain sensor 2 is preferably 10 mm and more preferably 5 mm. When the average width of the strain sensor 2 is less than the lower limit, the detection sensitivity may be insufficient or the strain sensor 2 may be torn through the motion of the measurement target site. To the contrary, when the average width of the strain sensor 2 is greater than the upper limit, the subject may feel discomfort.

In addition, the average length of the strain sensor 2 in the unloaded state is selected according to the measurement target site. In general, the lower limit of the average length of the strain sensor 2 in the unloaded state is preferably 3 mm, and more preferably 15 mm. Meanwhile, the upper limit of the average length of the strain sensor 2 in the unloaded state is preferably 70 mm, and more preferably 50 mm. When the average length of the strain sensor 2 is less than the lower limit, a slight positional deviation of the substrate 1 may largely change the detection value and a detection error may be great. To the contrary, when the average length of the strain sensor 2 is greater than the upper limit, a certain region may not undergo a change in length through a motion to be detected, whereby a rate of change in length of the strain sensor 2 in response to the motion may be so small that the detection sensitivity may be insufficient.

The lower limit of a load at 10% elongation of the strain sensor 2 is preferably 0.01 N, more preferably 0.03 N, and still more preferably 0.05 N. Meanwhile, the upper limit of the load at 10% elongation of the strain sensor 2 is preferably 0.5 N, more preferably 0.3 N, and still more preferably 0.2 N. When the load at 10% elongation of the strain sensor 2 is less than the lower limit, the detection accuracy may be insufficient, due to stretching and/or contracting in response to a factor other than the motion of the measurement target site. To the contrary, when the load at 10% elongation of the strain sensor 2 is greater than the upper limit, a reaction force upon stretch may increase, which may cause discomfort and a tightening sensation for the wearer.

The lower limit of the resistance value of each strain sensor 2 in the unloaded state is, for example, preferably 10Ω, and more preferably 100Ω. Meanwhile, the upper limit of the resistance value of the strain sensor 2 in the unloaded state is preferably 100 kΩ, and more preferably 10 kΩ. When the resistance value of the strain sensor 3 in the unloaded state is less than the lower limit, the electric current for detecting the stretch may increase, which may increase the power consumption. To the contrary, when the resistance value of the strain sensor 2 in the unloaded state is greater than the upper limit, the voltage of a detection circuit may increase, which may result in difficulty in downsizing and power-saving.

The rate of change in the resistance value by stretching of each strain sensor 2 is to be appropriately selected so as to achieve sufficient detection accuracy, and for example the ratio of a resistance value of the strain sensor 2 in the 10% elongated state to a resistance value of the strain sensor 2 in the unloaded state is, for example, 1.5-fold or more and 20-fold or less.

Adhesive attachment of the strain sensor 2 to the substrate 1 is preferably carried out by means of an adhesive that does not inhibit the stretching and contracting of the substrate 1 and the strain sensor 2, more specifically an adhesive that has a sufficiently small load at elongation. Examples of such an adhesive that has a sufficiently small load at elongation include moisture-curable polyurethane adhesives and the like.

Deformation Restraining Member

A pair of deformation restraining members 3 restrains deformation of the substrate 1 at both longitudinal ends of the strain sensor 2, thereby inhibiting the positional deviation of the strain sensor 2 through prevention of curling of the substrate 1 between the pair of deformation restraining members 3 and resulting improvement of adherence to the measurement target.

The deformation restraining member 3 in the present embodiment is arranged at a slight distance from the strain sensor 2 not to overlap the strain sensor 2. By thus arranging the deformation restraining member 3 to be spaced apart from the strain sensor 2, inhibition of a stress applied to the strain sensor 2 when the deformation restraining member 3 is inclined in a planar view is enabled.

Effective inhibition of positional deviation of the deformation restraining member 3 with respect to the measurement target is enabled by selecting a shape of the deformation restraining member 3 according to the irregularities on the measurement target, for example, such a shape that a portion of the substrate 1 in which the deformation restraining member 3 is arranged is fit into a recessed part on the surface of the human body. In this regard, the deformation restraining member 3 may be curved to bend the substrate 1 in the unloaded state in a cross-sectional view taken along a direction perpendicular to the longitudinal direction of the strain sensor 2.

The deformation restraining member 3 may be configured as: a separate member attached to the substrate 1 to increase rigidity; or a portion provided through, for example, stitching with a thread or application of a resin composition to restrain deformation of the substrate 1.

The deformation restraining member 3 preferably includes an elastic material having a greater modulus of elasticity in flexure than the strain sensor 2. In other words, the deformation restraining member 3 may be formed by attaching to the substrate 1 the elastic material having a greater modulus of elasticity in flexure than the strain sensor 2. Owing to the deformation restraining member 3 having the greater modulus of elasticity in flexure than the strain sensor 2, more reliable prevention of deformation of the substrate 1 accompanied by curling of the strain sensor 2 is enabled. Examples of an elastic material that may be used for forming the deformation restraining member 3 include a string-shaped or board-shaped member having a spring property, and the like.

The deformation restraining member 3 is preferably formed in a strip shape extending in a direction intersecting the longitudinal direction of the strain sensor 2. When the deformation restraining member 3 is thus formed in a strip shape, a reduction in an area of the deformation restraining member 3 and effective restraining of deformation of the substrate 1 are enabled. Accordingly, prevention of the positional deviation of the strain sensor 2 is enabled without deterioration of comfort in wearing of the strain sensor unit of the present embodiment.

The deformation restraining member 3 is preferably capable of preventing stretching and contracting of the substrate 1 in the direction intersecting the longitudinal direction of the strain sensor 2. Specifically, the deformation restraining member 3 preferably includes a closely coiled spring having a central axis extending in the direction intersecting the longitudinal direction of the strain sensor 2. The closely coiled spring is a coil spring formed by coiling a wire without an interspace, and is incompressible in a longitudinal direction (axial direction). In addition, through selection of a modulus of elasticity in flexure of the wire, the closely coiled spring can be made substantially inextensible but bendable to such a degree that the spring follows a surface shape of the measurement target during use of the strain sensor unit, while prevention of a great deformation that may cause curling of the substrate 1 and in turn reduction in likelihood of slip of the substrate 1 with respect to the measurement target are enabled.

The closely coiled spring is preferably fixed to a sheet-shaped material such as, for example, a fabric, an elastomer resin sheet, or the like. Specifically, the closely coiled spring may be either interposed between a pair of fabrics or a pair of elastomer resin sheets, or bonded or sewn to a fabric or an elastomer resin sheet. When the closely coiled spring is thus fixed to the sheet-shaped material, comparatively easy fixing of the closely coiled spring to the substrate 1, and in turn easy formation of the deformation restraining member 3 are enabled.

The lower limit of the maximum length of the deformation restraining member 3 in a direction orthogonal to the longitudinal direction of the strain sensor 2 is preferably 5 times and more preferably 10 times the average width of the strain sensor 2. Meanwhile, the upper limit of the maximum length of the deformation restraining member 3 in the direction orthogonal to the longitudinal direction of the strain sensor 2 is preferably 100 times and more preferably 50 times the average width of the strain sensor 2. When the maximum length of the deformation restraining member 3 in the direction orthogonal to the longitudinal direction of the strain sensor 2 is less than the lower limit, the positional deviation of the strain sensor 2 may not be sufficiently inhibited. To the contrary, when the maximum length of the deformation restraining member 3 in the direction orthogonal to the longitudinal direction of the strain sensor 2 is greater than the upper limit, the strain sensor unit may be unnecessarily large in width, which may cause discomfort and a tightening sensation for the wearer.

The lower limit of the width of the deformation restraining member 3 in the longitudinal direction of the strain sensor 2 is not particularly limited, and may be such a width that the deformation restraining member 3 has sufficiently high rigidity. Meanwhile, the upper limit of the width of the deformation restraining member 3 in the longitudinal direction of the strain sensor 2 is preferably 1 time and more preferably 0.5 times the average width of the strain sensor 2. When the width of the deformation restraining member 3 in the longitudinal direction of the strain sensor 2 is greater than the upper limit, the strain sensor unit may be unnecessarily large in width, which may cause discomfort and a tightening sensation for the wearer.

The modulus of elasticity in flexure of the deformation restraining member 3 may vary according to a cross sectional area thereof, and is preferably greater than that of the strain sensor 2 and great enough to prevent curling of the substrate 1. Specifically, the lower limit of the modulus of elasticity in flexure of the deformation restraining member 3 is preferably 1 kPa and more preferably 10 kPa. Meanwhile, the upper limit of the modulus of elasticity in flexure of the deformation restraining member 3 is preferably 10 MPa and more preferably 1 MPa. When the modulus of elasticity in flexure of the deformation restraining member 3 is less than the lower limit, curling of the substrate 1 may not be prevented and consequently the positional deviation of the strain sensor 2 may not be inhibited. To the contrary, when the modulus of elasticity in flexure of the deformation restraining member 3 is greater than the upper limit, the substrate 1 may not adhere to the measurement target, which may cause discomfort and a tightening sensation for the wearer.

Advantages

Due to providing the pair of deformation restraining members 3 in proximity to the longitudinal end portions of the strain sensor 2 respectively, the substrate 1 is less likely to deform on both sides of the strain sensor 2, resulting in inhibition of the positional deviation of the strain sensor 2, and consequently the strain sensor unit of the present embodiment has comparatively high detection accuracy.

Second Embodiment

Figure 3:
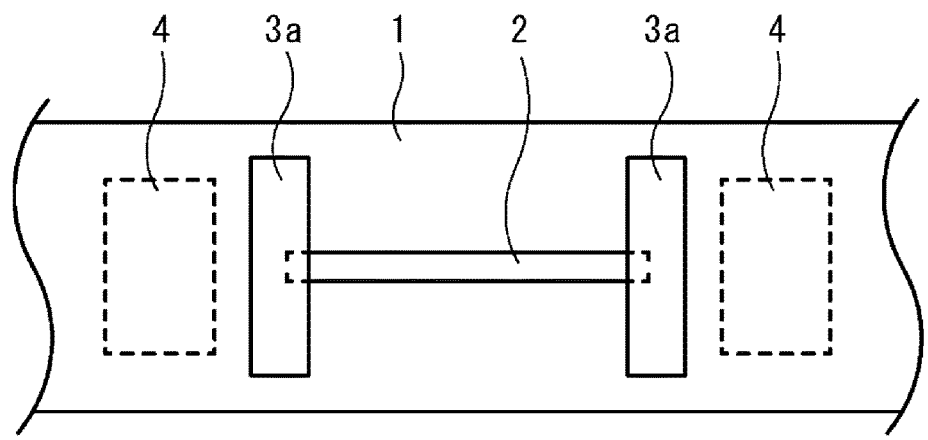
FIG. 3 is a schematic plan view of a strain sensor unit according to an embodiment of the present invention different from that of FIG. 1.
Figure 4:
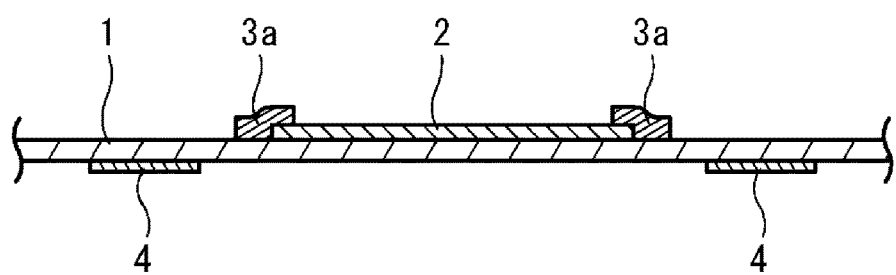
FIG. 4 is a schematic cross sectional view of the strain sensor unit of FIG. 3.

The strain sensor unit according to a second embodiment of the present invention shown in FIGS. 3 and 4 includes: a substrate 1 that is stretchable; a strip-shaped strain sensor 2 that is overlaid on a top face of the substrate 1 and arranged along a direction of stretching and contracting of the substrate 1; a pair of deformation restraining members 3a that are arranged in proximity to longitudinal end portions of the strain sensor 2 respectively, to extend in a direction intersecting a longitudinal direction of the strain sensor 2, and restrain deformation of the substrate 1; and a pair of anti-slipping members 4 that are arranged on a back face of the substrate 1, on both longitudinal-end sides of the strain sensor 2 in a planar view, respectively.

The substrate 1 and the strain sensor 2 in the strain sensor unit illustrated in FIGS. 3 and 4 may have similar constitutions to the substrate 1 and the strain sensor 2 in the strain sensor unit illustrated in FIGS. 1 and 2. Hereinafter, with regard to the strain sensor unit illustrated in FIGS. 3 and 4, constitutive elements that are identical to those of the strain sensor unit illustrated in FIGS. 1 and 2 are referred to with the same reference numerals and explanation thereof is omitted.

Deformation Restraining Member

The deformation restraining member 3a in the strain sensor unit illustrated in FIGS. 3 and 4 is similar to the deformation restraining member 3 in the strain sensor unit illustrated in FIGS. 1 and 2 except for being arranged to overlap the longitudinal end portion of the strain sensor 2.

In the case in which the deformation restraining member 3a is arranged to overlap the longitudinal end portion of the strain sensor 2, a distance between the pair of deformation restraining members 3a is comparatively small and consequently the strain sensor unit of the present embodiment is capable of inhibit the positional deviation of the strain sensor 2 more reliably.

Anti-Slipping Member

The anti-slipping member 4 is overlaid on the back face of the substrate 1 to enhance friction with the measurement target, thus enabling more reliable inhibition of the positional deviation of the substrate 1, and in turn the positional deviation of the strain sensor 2.

The anti-slipping member 4 may be arranged either to overlap the deformation restraining member 3a in a planar view, or on an outer side of the deformation restraining member 3a.

Examples of a material that may be used for the anti-slipping member 4 include a synthetic rubber, a natural rubber, and the like. The planar shape of the anti-slipping member 4 is not particularly limited and may be, for example, an arbitrary shape such as a square shape, a circular shape and the like, or in a patterned shape that partially exposes or covers the substrate 1.

The anti-slipping member 4 may be either bonded to the back face of the substrate 1, or formed by applying a resin composition on the back face of the substrate 1.

The lower limit of an average length of the anti-slipping member 4 in the longitudinal direction of the strain sensor 2 is preferably 1 mm and more preferably 3 mm. Meanwhile, the upper limit of the average length of the anti-slipping member 4 in the longitudinal direction of the strain sensor 2 is preferably 50 mm and more preferably 30 mm. When the average length of the anti-slipping member 4 in the longitudinal direction of the strain sensor 2 is less than the lower limit, a lack of enhancement of friction may lead to a failure to promote an effect of inhibiting the positional deviation of the strain sensor 2. To the contrary, when the average length of the anti-slipping member 4 in the longitudinal direction of the strain sensor 2 is greater than the upper limit, the strain sensor unit may be unnecessarily large in size.

The lower limit of an average length of the anti-slipping member 4 in a direction perpendicular to the longitudinal direction of the strain sensor 2 is preferably 3 mm and more preferably 5 mm. The upper limit of the average length of the anti-slipping member 4 in the direction perpendicular to the longitudinal direction of the strain sensor 2 is preferably 1.2 times and more preferably 1 time the length of the deformation restraining member 3a. When the average length of the anti-slipping member 4 in the direction perpendicular to the longitudinal direction of the strain sensor 2 is less than the lower limit, a lack of enhancement of friction may lead to a failure to promote the effect of inhibiting the positional deviation of the strain sensor 2. To the contrary, when the average length of the anti-slipping member 4 in the direction perpendicular to the longitudinal direction of the strain sensor 2 is greater than the upper limit, the strain sensor unit may be unnecessarily large in size.

Third Embodiment

Figure 5:
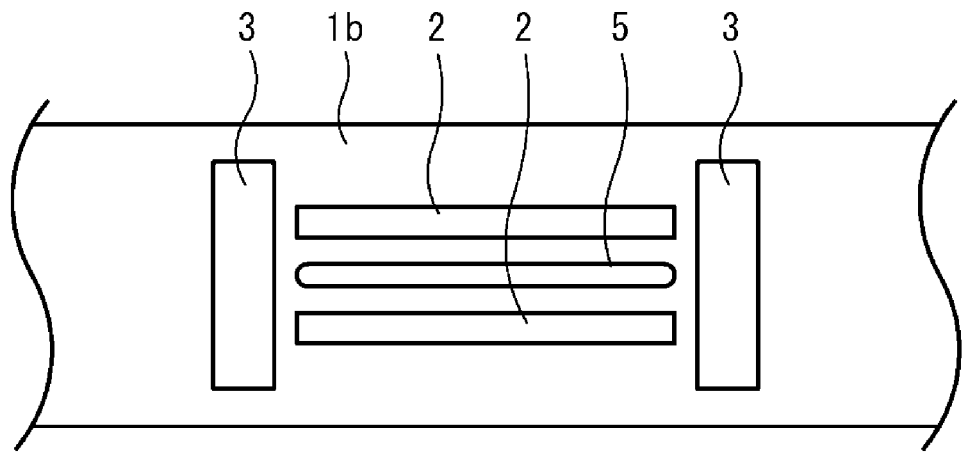
FIG. 5 is a schematic plan view of a strain sensor unit according to an embodiment of the present invention different from those of FIGS. 1 and 3.

The strain sensor unit according to a third embodiment of the present invention shown in FIG. 5 includes: a substrate 1b that is stretchable; a plurality (two) of strip-shaped strain sensors 2 that are overlaid on a top face of the substrate 1 and arranged in parallel along a direction of stretching and contracting of the substrate 1; and a pair of deformation restraining members 3 that are arranged in proximity to longitudinal end portions of the plurality of strain sensors 2 respectively, to extend in a direction intersecting a longitudinal direction of the strain sensor 2, and restrain deformation of the substrate 1.

The strain sensor 2 and the deformation restraining member 3 in the strain sensor unit illustrated in FIG. 5 may have similar constitutions to the strain sensor 2 and the deformation restraining member 3 in the strain sensor unit illustrated in FIGS. 1 and 2. Hereinafter, with regard to the strain sensor unit illustrated in FIG. 5, constitutive elements that are identical to those of the strain sensor unit illustrated in FIGS. 1 and 2 are referred to with the same reference numerals and explanation thereof is omitted.

Substrate

The substrate 1b has, between the plurality of strain sensors 2, a slit 5 that is parallel to the strain sensors 2.

Slit

The slit 5 divides the substrate 1b between the plurality of strain sensors 2 to enable the plurality of strain sensors 2 to stretch and contract each independently. In other words, displacement of one strain sensor 2 is less likely to affect displacement of another strain sensor 2, and therefore the strain sensor unit of the present embodiment has comparatively high detection accuracy.

The lower limit of a length of the slit 5 is preferably ½ and more preferably ⅔ of a length of a center line of the strain sensor 2 in the width direction. Meanwhile, the upper limit of the length of the slit 5 is preferably 1.2 times and more preferably 1 time the length of the center line of the strain sensor 2 in the width direction. When the length of the slit 5 is less than the lower limit, interference between the strain sensors 2 may not be sufficiently reduced. To the contrary, when the length of the slit 5 is greater than the upper limit, the strain sensor unit may be unnecessarily large in size, and an effect of inhibiting positional deviation of the strain sensor 2 achievable by the deformation restraining member 3 may be reduced.

Other Embodiments

The embodiments described above do not restrict the constituent features of the present invention. Therefore, any omission, substitution and addition of each of the constituent features of the embodiments can be made on the basis of the description of the present specification and common general technical knowledge, and such omitted, substituted and/or added features are to be construed to entirely fall under the scope of the present invention.

Figure 6:
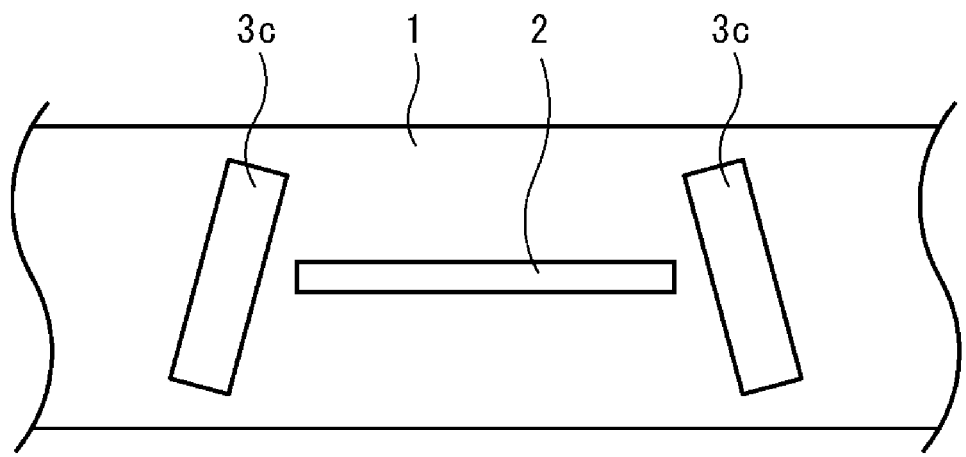
FIG. 6 is a schematic plan view of a strain sensor unit according to an embodiment of the present invention different from those of FIGS. 1, 3 and 5.
Figure 7:
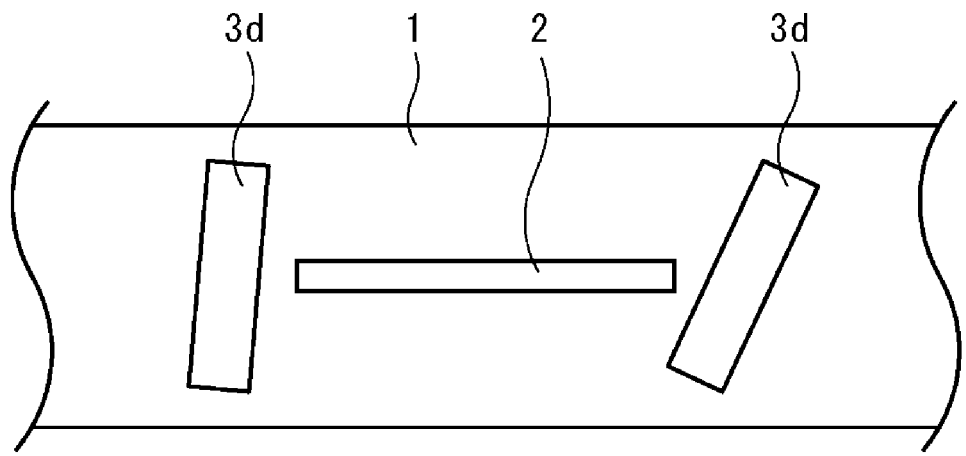
FIG. 7 is a schematic plan view of a strain sensor unit according to an embodiment of the present invention different from those of FIGS. 1, 3, 5 and 6.

In the strain sensor unit, as illustrated in FIG. 6, a pair of deformation restraining members 3c may be inclined with respect to a direction perpendicular to the longitudinal direction of the strain sensor 2, or as illustrated in FIG. 7, a pair of deformation restraining members 3d may be arranged at different inclination angles with respect to the longitudinal direction of the strain sensor 2.

Figure 8:
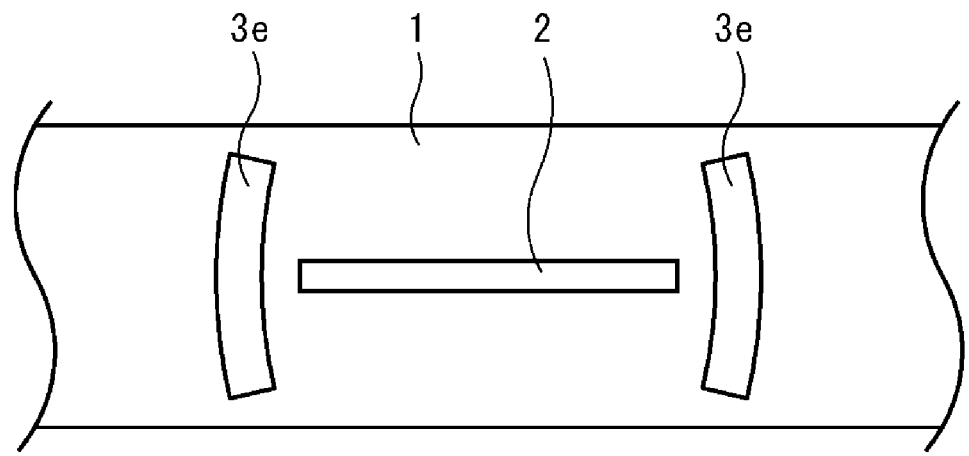
FIG. 8 is a schematic plan view of a strain sensor unit according to an embodiment of the present invention different from those of FIGS. 1, 3 and 5 to 7.

Alternatively, in the strain sensor unit, as illustrated in FIG. 8, the deformation restraining member 3e may be bent or curved.

Figure 9:
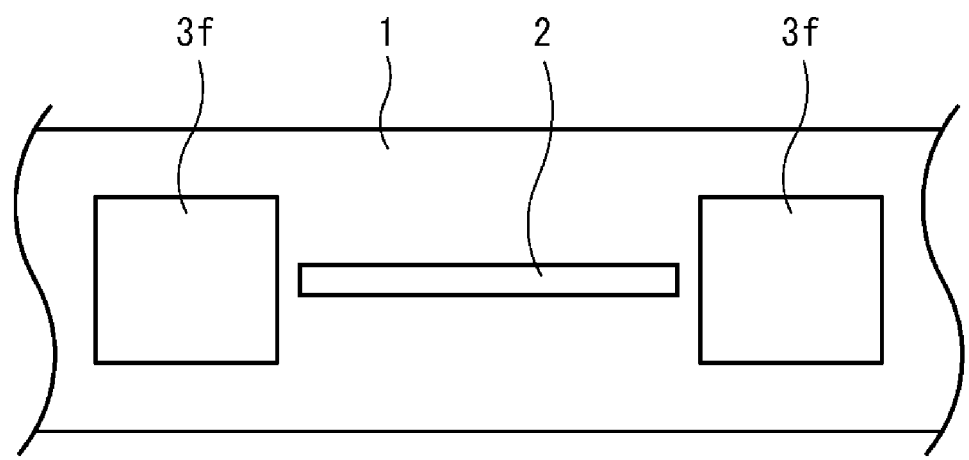
FIG. 9 is a schematic plan view of a strain sensor unit according to an embodiment of the present invention different from those of FIGS. 1, 3 and 5 to 8.

In the strain sensor unit, for example as illustrated in FIG. 9, a planar shape of the deformation restraining member 3f may be elongated in the longitudinal direction of the strain sensor 2. In other words, the deformation restraining member in the strain sensor unit is only required to have a length in a direction perpendicular to the longitudinal direction of the strain sensor in a planar view being greater than the width of the strain sensor.

In the strain sensor unit, the deformation restraining member may be formed from a material having a modulus of elasticity in flexure smaller than the strain sensor, as long as the deformation restraining member is capable of partially inhibiting the deformation of the substrate.

The strain sensor unit may be provided with the deformation restraining member in proximity to only one end portion of the strain sensor.

The strain sensor unit may be provided with three or more strain sensors arranged in parallel. In addition, the strain sensor unit may not have the slit on the substrate even in the case of having a plurality of strain sensors arranged in parallel.

In the strain sensor unit, the strain sensor may be string-shaped. Furthermore, the strain sensor may be sewn into the substrate.

In the strain sensor unit, the substrate may not be strip-shaped and may have an arbitrary shape similar to, for example, a mask, a shirt or the like, fitted to the human body.

In the strain sensor unit, the strain sensor may be arranged at a position away from the center of the substrate in the crosswise direction.

In the strain sensor unit, the deformation restraining member may be overlaid on the back face side of the substrate. In this case, the deformation restraining member may also serve as the anti-slipping member.

A plurality of strain sensors may be provided on one substrate, and a pair of deformation restraining members may be arranged on both longitudinal-end sides of each strain sensor. For example, in order to detect motions of a plurality of mimic muscles and the like, a plurality of strain sensors having different shapes and pairs of deformation restraining members may be arranged on a mask-shaped substrate at different orientations.

INDUSTRIAL APPLICABILITY

The strain sensor unit according to the present invention may be used particularly suitably for detecting motions of the human body, buy may also be used for detecting motions of animals, machines, and the like in addition to the human body.

EXPLANATION OF THE REFERENCE SYMBOLS 1, 1b Substrate
2 Strain sensor
3, 3a, 3c, 3d, 3e, 3f Deformation restraining member
4 Anti-slipping member
5 Slit

The invention claimed is:
1. A strain sensor unit comprising:
a substrate that is stretchable;
at least one strain sensor that is strip-shaped or string-shaped and arranged on the substrate along a direction of stretching and contracting; and
at least one deformation restraining member that is arranged entirely on the substrate and in proximity to a longitudinal end portion of the at least one strain sensor, to be spaced apart from the at least one strain sensor and extend in a direction intersecting a longitudinal direction of the strain sensor, and restrains deformation of the substrate, wherein the at least one deformation restraining member comprises at least a pair of deformation restraining members, and the pair of the deformation restraining members are arranged in proximity to both longitudinal end portions of the at least one strain sensor, respectively.

2. The strain sensor unit according to claim 1, wherein the deformation restraining member comprises an elastic material having a greater modulus of elasticity in flexure than the strain sensor.

3. The strain sensor unit according to claim 1, wherein:
the at least one strain sensor comprises a plurality of strain sensors which are arranged in parallel; and
the substrate comprises, between the plurality of strain sensors, a slit that is parallel to the strain sensors.

4. The strain sensor unit according to claim 1, wherein the deformation restraining member comprises a closely coiled spring having a central axis extending in the direction intersecting the longitudinal direction of the strain sensor.

5. The strain sensor unit according to claim 1, further comprising a pair of anti-slipping members that are arranged on a back face of the substrate, on both longitudinal-end sides of the strain sensor in a planar view, respectively.

6. The strain sensor unit according to claim 1, wherein an overall length of the at least one deformation restraining member in a direction orthogonal to the longitudinal direction of the at least one strain sensor is no less than an average width of the at least one strain sensor.

7. The strain sensor according to claim 1, wherein
the at least one deformation restraining member is configured to prevent curling of the substrate.

* * * * *